United States Patent
Taylor et al.

(10) Patent No.: US 11,586,635 B2
(45) Date of Patent: Feb. 21, 2023

(54) METHODS AND SYSTEMS FOR RANKING COMMENTS ON A POST IN AN ONLINE SERVICE

(71) Applicant: META PLATFORMS, INC., Menlo Park, CA (US)

(72) Inventors: Sean Jude Taylor, San Francisco, CA (US); Nan Li, San Francisco, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 1400 days.

(21) Appl. No.: 15/404,136

(22) Filed: Jan. 11, 2017

(65) Prior Publication Data

US 2018/0197109 A1 Jul. 12, 2018

(51) Int. Cl.
| | |
|---|---|
| *G06F 16/2457* | (2019.01) |
| *H04L 67/306* | (2022.01) |
| *G06N 20/00* | (2019.01) |
| *G06F 16/9535* | (2019.01) |
| *H04L 51/52* | (2022.01) |
| *H04L 51/216* | (2022.01) |
| *H04L 67/50* | (2022.01) |
| *G06Q 50/00* | (2012.01) |

(52) U.S. Cl.
CPC .... *G06F 16/24578* (2019.01); *G06F 16/9535* (2019.01); *G06N 20/00* (2019.01); *H04L 51/216* (2022.05); *H04L 51/52* (2022.05); *H04L 67/306* (2013.01); *H04L 67/535* (2022.05); *G06Q 50/01* (2013.01)

(58) Field of Classification Search
None
See application file for complete search history.

(56) References Cited

U.S. PATENT DOCUMENTS

| 10,049,664 B1* | 8/2018 | Indyk | G10L 15/02 |
| 10,402,465 B1* | 9/2019 | Jain | H04L 67/535 |
| 2007/0143345 A1* | 6/2007 | Jones | G06F 17/30241 |
| 2012/0233183 A1* | 9/2012 | Nakahashi | G06Q 30/02 |
| | | | 707/749 |
| 2013/0290905 A1* | 10/2013 | LuVogt | G06N 3/006 |
| | | | 715/835 |
| 2014/0191981 A1* | 7/2014 | Ramasarma | G06F 1/3287 |
| | | | 345/173 |
| 2015/0142555 A1* | 5/2015 | Zheng | G06Q 30/0241 |
| | | | 705/14.43 |
| 2015/0220996 A1* | 8/2015 | Bhamidipati | G06Q 30/0269 |
| | | | 705/14.45 |

(Continued)

OTHER PUBLICATIONS

Slash(dot) and Burn: Distributed Moderation in a Large Online Conversation Space, Cliff Lampe and Paul Resnick, School of Information University of Michigan. (Year: 2004).*

*Primary Examiner* — Kris E Mackes
*Assistant Examiner* — Soheila (Gina) Davanlou
(74) *Attorney, Agent, or Firm* — Morgan, Lewis & Bockius LLP

(57) ABSTRACT

A server system receives a plurality of comments on a post in an online service, receives feedback on respective comments of the plurality of comments from users of the online service and retrieves feedback weights for the users. The server system ranks the plurality of comments using the feedback and feedback weights and provides the plurality of comments, ordered in accordance with the ranking, for display.

20 Claims, 7 Drawing Sheets

(56) References Cited

U.S. PATENT DOCUMENTS

| | | | |
|---|---|---|---|
| 2017/0142044 A1* | 5/2017 | Ball | H04L 51/12 |
| 2017/0155613 A1* | 6/2017 | Ganci, Jr. | H04L 51/32 |
| 2017/0353421 A1* | 12/2017 | Lytkin | H04L 51/32 |
| 2018/0189289 A1* | 7/2018 | Wexler | G06F 16/9535 |
| 2018/0260416 A1* | 9/2018 | Elkaim | G06F 17/30265 |

* cited by examiner

METHODS AND SYSTEMS FOR RANKING COMMENTS ON A POST IN AN ONLINE SERVICE

TECHNICAL FIELD

This relates generally to organizing comments received on a post in an online service, including but not limited to ranking comments received on the post submitted by users of an online service.

BACKGROUND

Social networks and instant messaging programs on electronic devices provide a convenient means of communication between individuals. Social networking has been growing in popularity, and has become a prominent form of communication (e.g., photos, videos, news, advertisements). Sorting through large amounts of data to distinguish important posts, comments, or feedback can become cumbersome.

SUMMARY

Accordingly, there is a need for methods, systems, and interfaces for displaying comments (e.g., feedback) that are most relevant. For example, displaying the most relevant comments allows the users of the online service to easily access the most pertinent and compelling comments.

In accordance with some embodiments, a method is performed at a server system having one or more processors and memory storing instructions for execution by the one or more processors. The method includes receiving a plurality of comments on a post in an online service, receiving feedback on respective comments of the plurality of comments from users of the online service, and retrieving feedback weights for the users. The method further includes ranking the plurality of comments using the feedback and feedback weights and providing the plurality of comments ordered in accordance with the ranking, for display.

In accordance with some embodiments, a server system associated with an online service includes a processor and memory storing one or more programs for execution by the processor. The one or more programs include instructions for performing the operations of the server-side method described above. In accordance with some embodiments, a non-transitory computer-readable storage medium stores instructions that, when executed by a server system, cause the server system to perform the operations of the server-side method described above.

In accordance with some embodiments, a method is performed at a first user device having one or more processors and memory storing instructions for execution by the one or more processors. The first user device receives a plurality of comments on a post in an online service. The method further includes receiving feedback on respective comments of the plurality of comments from users of the online service, retrieving feedback weights for the users. The method further includes ranking the plurality of comments using the feedback and the feedback weights and displaying the plurality of comments in accordance with the ranking.

In accordance with some embodiments, a non-transitory computer-readable storage medium includes one or more processors, memory, and one or more programs. The one or more programs are stored in the memory and configured to be executed by the one or more processors. The one or more programs include instructions for performing the operations of the method described above for the server system. In accordance with some embodiments, a non-transitory computer-readable storage medium stores instructions that, when executed by the non-transitory computer-readable storage medium, cause the server system to perform the operations of the method described above.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user device could be termed a second user device, and, similarly, a second user device could be termed a first user device, without departing from the scope of the various described embodiments. The first user device and the second user device are both user devices, but they are not the same user device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
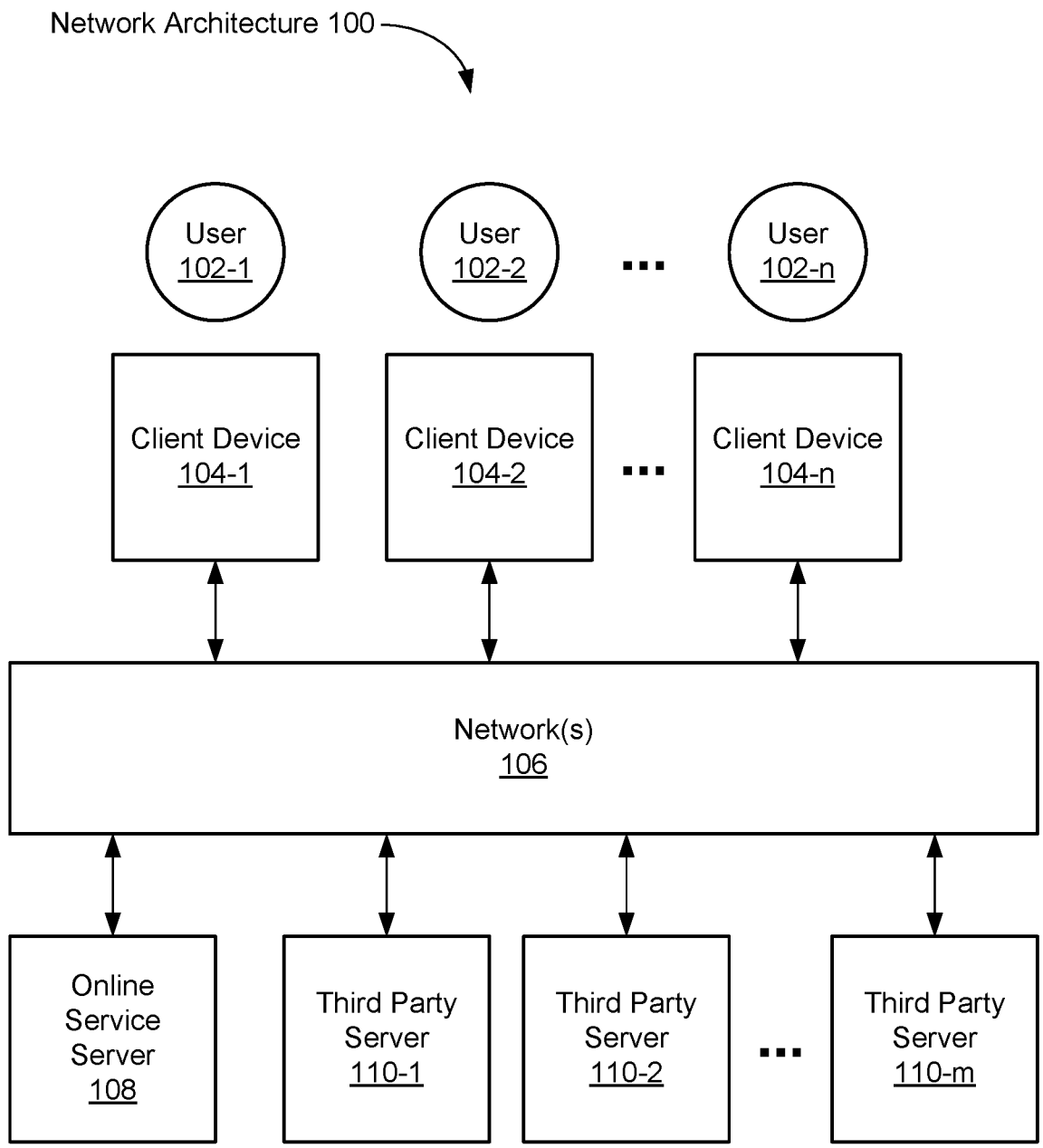
FIG. 1 is a block diagram illustrating an exemplary network architecture of a social network, in accordance with some embodiments.

FIG. 1 is a block diagram illustrating an exemplary network architecture 100 of a social network, in accordance with some embodiments. The network architecture 100 includes a number of client devices (also called "client systems," "client computers," or "clients") 104-1, 104-2, . . . 104-n communicably connected to an electronic online service server 108 (e.g., a server system) by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the online service server 108. In some embodiments, the online service server 108 is a single computing device such as a computer server, while in other embodiments, the online service server 108 is implemented by multiple computing devices working together to perform the actions of a server system (e.g., cloud computing).

Users 102-1, 102-2, . . . 102-n employ the client devices 104-1, 104-2, . . . 104-n to access the online service server 108 and to participate in a corresponding online service provided by the online service server 108. For example, one or more of the client devices 104-1, 104-2, . . . 104-n execute software applications that are specific to the online service (e.g., social-networking "apps" running on smart phones or tablets, such as a Facebook social-networking application running on an iPhone, Android, or Windows smart phone or tablet). In some embodiments, the online service server 108 is a server system for an online service provider that provides access to at least some services and/or features for third-party providers. Users interacting with the client devices 104-1, 104-2, . . . 104-n can participate in the online service provided by the online service server 108 by providing and/or consuming (e.g., posting, writing, viewing, publishing, broadcasting, promoting, recommending, sharing, commenting on, liking) digital content, such as text comments (e.g., statuses, updates, posts, announcements, replies, location "check-ins," private/group messages), photos, videos, audio files, links (e.g., to web pages, articles, pages associated with third-party service providers, etc.), documents, advertisements, and/or other electronic content.

Users of the online service can also annotate information posted by other users of the online service (e.g., endorsing or "liking" a posting of another user, commenting on a post by another user or publishing source, and/or providing other types of user feedback). In some embodiments, information can be posted on a user's behalf by systems and/or services external to the online service server 108. For example, a user may post a review of a movie to a movie-review website, and with proper permissions that website may cross-post the review to the online service 108 on the user's behalf.

In connection with using or participating in an online service, the digital content that users may consume, provide, and/or otherwise interact with is accessible through various features or entry points of the online service. For example, digital content may be accessible and presented via one or more pages, feeds (e.g., a newsfeed, a user wall, a timeline, a notifications section for highlighting new/updates to digital content, etc.), applications, and/or other interfaces for specific types of digital content (e.g., interfaces for accessing private messages, accessing saved online service content, searching for online service content, etc.) maintained by and within the online service. As described throughout, pages associated with third-party providers may be linked to in various ways (e.g., within a user post in a feed, a notification, a private message between users, etc.).

Figure 3:
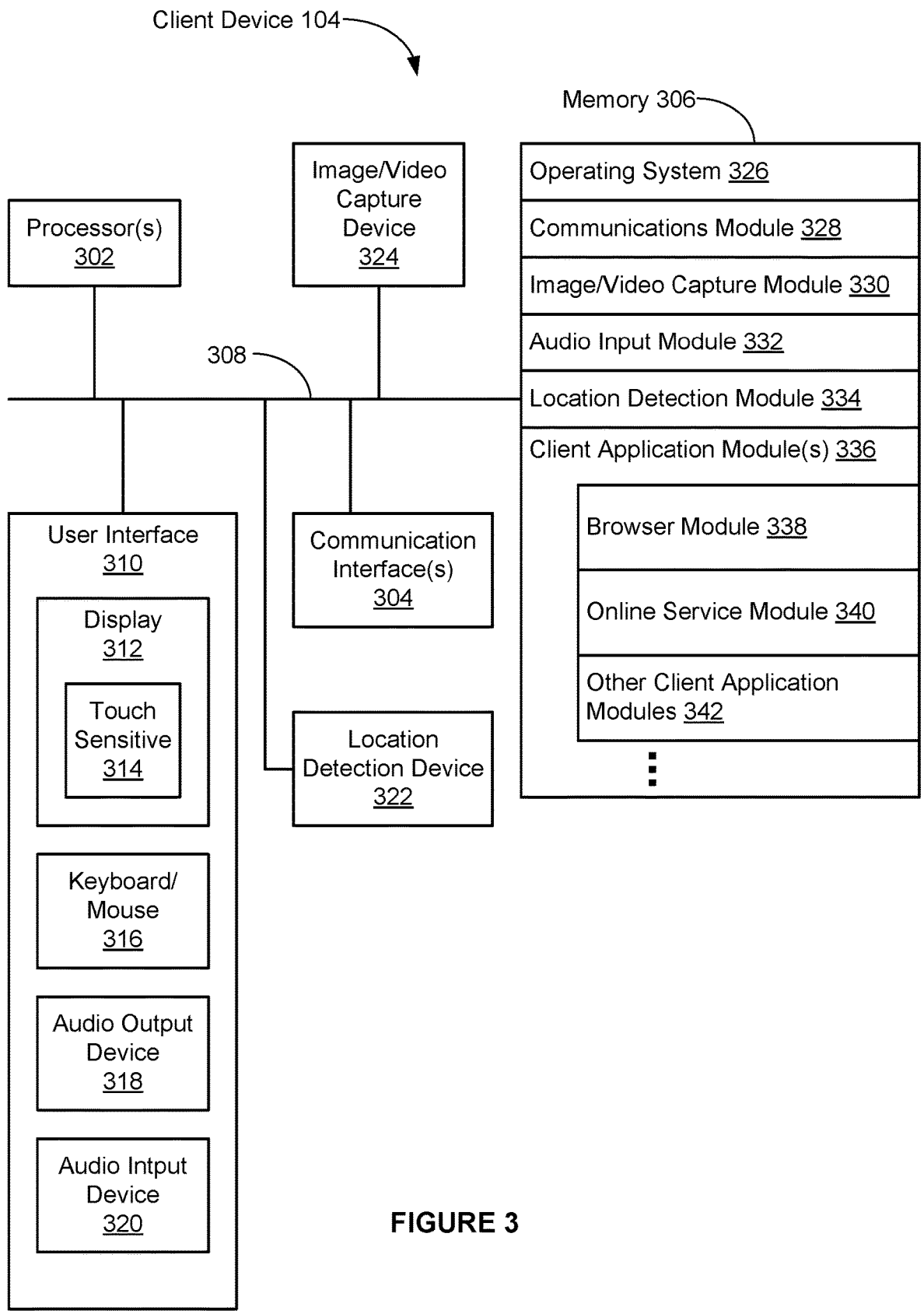
FIG. 3 is a block diagram illustrating an exemplary client device, in accordance with some embodiments.

In some embodiments, a software application executing on a mobile client device, with proper permissions, may obtain information from hardware resources/components of the client device (e.g., image/video capture device 324, location detection device 322, microphone, sensors, etc., FIG. 3). For example, global positioning system (GPS, GLONASS, Galileo, BeiDou) or other geo-location capabilities (e.g., Wi-Fi or hybrid positioning systems) may be accessed by a software application on the client device (e.g., social network client module 340, FIG. 3) to determine the user's location and update the online service 108 with the user's location (e.g., "At Home," "At Work," or "In San Francisco, Calif."), and/or update the online service 108 with information derived from and/or based on the user's location. Users interacting with the client devices 104-1, 104-2, . . . 104-n can also use the online service provided by the online service server 108 to define groups of users. Users interacting with the client devices 104-1, 104-2, . . . 104-n can also use the online service provided by the online service server 108 to communicate and collaborate with each other.

In some embodiments, the network architecture 100 also includes third-party servers 110-1, 110-2, . . . 110-m. In some implementations, third-party servers 110 are associated with third-party service providers who provide services and/or features to users of a network (e.g., users of the online service server 108, FIG. 1). Users may conduct transactions (e.g., financial transactions) with the third-party service providers by communicating and exchanging data with third-party servers 110 directly (e.g., via networks 106) and/or indirectly (e.g., via online service 108).

For example, in some embodiments, a given third-party server 110 is used to host third-party websites that provide pages to client devices 104, either directly or in conjunction with the online service server 108. In some embodiments, a given third-party server 110 is used to host third-party applications that are used by client devices 104, either directly or in conjunction with the online service server 108.

In some embodiments, users may access third-party services by loading pages associated with third-party service providers within an application for a service provider distinct from the third-party service providers (e.g., by selecting links provided within social network client module 340 to access pages of a third-party service). Pages are a type of digital document that may include some common elements of other web documents (e.g., document includes markup language, such as Hyper Text Markup Language (HTML), Extensible Markup Language (XML), Java, etc.).

Pages may also include script (e.g., one or more distinct scripts) (e.g., JavaScript inserted into the page by the online service server 108) for calling one or more application programming interfaces (APIs) of a server system for the online service (e.g., one or more APIs of the online service server 108, FIG. 1) to obtain user information (e.g., location information, payment credentials, profile information, etc. collected and stored in connection with using the online service). The script may be executed at some time during a user's interaction with the loaded page (e.g., when the page is loaded, in response to a detected interaction within a loaded page, etc.).

The script allows user information maintained by the online service to be leveraged in transactions conducted between users and third-party service providers. These implementations provide a more efficient, integrated, and seamless alternative to accessing third-party services and features via stand-alone third-party applications (e.g., other client application modules 342, distinct from social network client module 340, FIG. 3), while optionally leveraging user information maintained in connection with other service providers in a network (e.g., an online service provided by online service server 108).

Exemplary third-party services (e.g., provided by third-party service providers) include, but are not limited to, services, products, and/or applications for or related to: books, business, communication, contests, e-commerce (e.g., pages for purchasing goods or services from online retailers), education, entertainment, fashion, finance, food and drink, games, health and fitness, lifestyle, local information (e.g., pages for real-time viewing of mass transit schedules), movies (e.g., pages for movie reviews, purchasing movie tickets, etc.), television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the online service server 108. In some embodiments, a given third-party server 110 is used to provide third-party content (e.g., news articles, reviews, message feeds, etc.).

In some embodiments, a given third-party server 110 is a single computing device (e.g., server computer), while in other embodiments, a given third-party server 110 is implemented by multiple computing devices working together to perform the actions of a server system (e.g., cloud computing).

Figure 2:
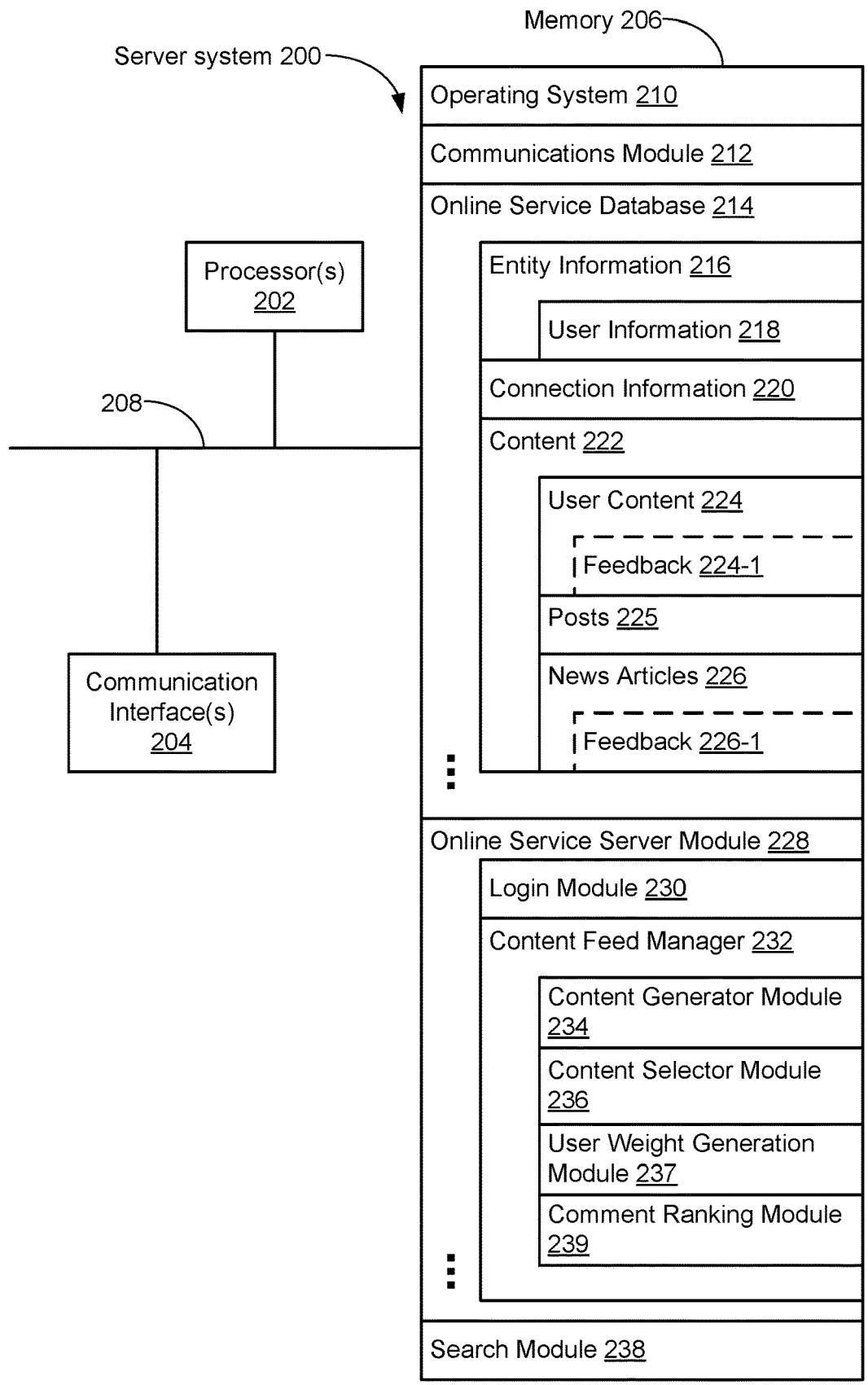
FIG. 2 is a block diagram illustrating an exemplary server system, in accordance with some embodiments.

FIG. 2 is a block diagram illustrating an exemplary online service server 108, in accordance with some embodiments. The online service server 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The online service server 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the online service server 108 to other computers via the one or more communication network interfaces 204 (wired or wireless) and one or more communication networks (e.g., the one or more networks 106);
- an online service database 214 for storing data associated with the social networking service, such as:
- entity information 216, such as user information 218; connection information 220; and
    content 222, such as:
        user content 224 and feedback 224-1; and/or
        posts 225;
        news articles 226 and feedback 226-1;
- an online service server module 228 for providing online services and related features (e.g., in conjunction with social network client module 340 on the client device 104, FIG. 3), which includes:
    a login module 230 for logging a user 102 at a client 104 into the online service server 108;
        a content feed manager 232 for providing content to be sent to clients 104 for display, which includes:
        a content generator module 234 for adding objects to the social network database 214, such as images, videos, audio files, comments, status messages, links, applications, and/or other entity information 216, connection information 220, or content 222; and
        a content selector module 236 for choosing the information/content to be sent to clients 104 for display; and
        a user weight generation module 237 for generating a user feedback weight for users of the online service;
        a comment ranking module 239 for ranking the comments received by users;
        a search module 238 for enabling users of the online service to search for content and other users in the online service;
        application programming interfaces (APIs) 242 (not displayed in FIG. 2) for receiving API calls (e.g., from script in a page) to obtain information associated with users (e.g., of the online service), and in response, retrieving (e.g., from social network database 214) and providing (e.g., to client devices 104) the requested information; and an optional page cache 244 (not displayed in FIG. 2) storing pages associated with third-party service providers (e.g., obtained from third-party servers 110).

The online service database 214 stores data associated with the social network in one or more types of databases, such as graph, dimensional, flat, hierarchical, network, object-oriented, relational, text, and/or XML databases.

In some embodiments, the online service database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, payment credentials (e.g., credit-card or debit-card information, bank information, etc. for conducting financial transactions through the online service), privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the online service server 108 (e.g., in content 222) or on an external server, such as third-party server 110.

In some embodiments, connection information 220 includes information about the relationships between entities in the online service database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the online service server 108 transmits a "friend request" to the second user. If the second user confirms the "friend request," the online service server 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the online service that corresponds to the entity at the other node may include, for example, a selectable "like," "check in," or "add to favorites" icon. After the user clicks one of these icons, the online service server 108 may create a "like" edge, "check in" edge, or a "favorites" edge in response to the corresponding user action. As another example, the user may listen to a particular song using a particular application (e.g., an online music application). In this case, the online service server 108 may create a "listened" edge and a "used" edge between the user node that corresponds to the user and the entity nodes that correspond to the song and the application, respectively, to indicate that the user listened to the song and used the application. In addition, the online service server 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., script for API calls), podcasts, links, and the like.

In some embodiments, the online service server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Python, Asynchronous JavaScript and XML (AJAX), XHP, Javelin, Wireless Universal Resource File (WURFL), and the like.

In some implementations, third-party servers 110 (FIG. 1) include some or all of the same components, modules, and sub-modules as described above in FIG. 2 for the online service server 108.

FIG. 3 is a block diagram illustrating an exemplary client device 104, in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite), GLONASS, Galileo, BeiDou, or other geo-location receiver, for determining the location of the client device 104. The client device 104 also optionally includes an image/video capture device 324, such as a camera or web cam.

In some embodiments, the client device 104 includes one or more optional sensors 323 (e.g., gyroscope, accelerometer, inertial measurement unit) for detecting a motion and/or change in orientation of the client device. In some embodiments, a detected motion and/or orientation of the client device 104 (e.g., the motion/change in orientation corresponding to a user input produced by a user of the client device) is used to manipulate an interface (or content within the interface) displayed on the client device 104.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the online service server 108;
- an audio input module 332 (e.g., a microphone module) for processing audio captured by the audio input device 320, where the respective audio may be sent or streamed (e.g., by a client application module 336) to the online service server 108;
- a location detection module 334 (e.g., a GPS, GLONASS, Galileo, BeiDou, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:
    - a web browser module 338 (e.g., Internet Explorer or Edge by Microsoft, Firefox by Mozilla, Safari by Apple, or Chrome by Google) for accessing, viewing, and interacting with web sites;
    - an online service module 340 for providing an interface to an online service (e.g., an online service provided by online service server 108) and related features, and for loading (e.g., within the interface for the social network module 340) pages associated with third-party service providers (e.g., to conduct transactions with the third-party service providers); and/or
    - optional client application modules 342, such as applications for word processing, calendaring, mapping, weather, stocks, time keeping, virtual digital assistant, presenting, number crunching (spreadsheets), drawing, instant messaging, e mail, telephony, video conferencing, photo management, video management, a digital music player, a digital video player, 2D gaming, 3D gaming, virtual reality, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

Figure 4A:
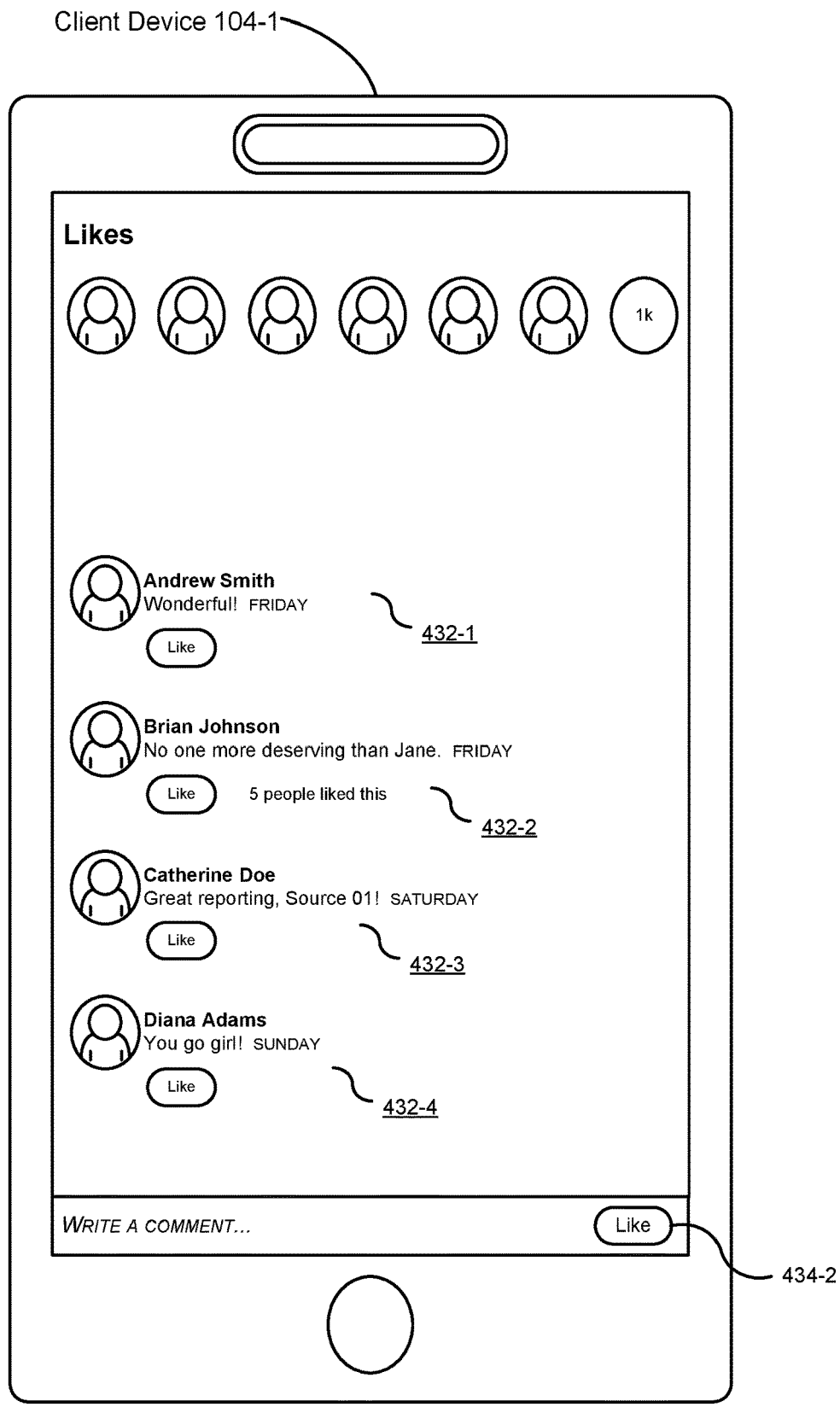
FIGS. 4A-4B illustrates exemplary graphical user interfaces (GUIs) on a client device for registering a contact without an account on an online service in accordance with some embodiments.
Figure 4B:
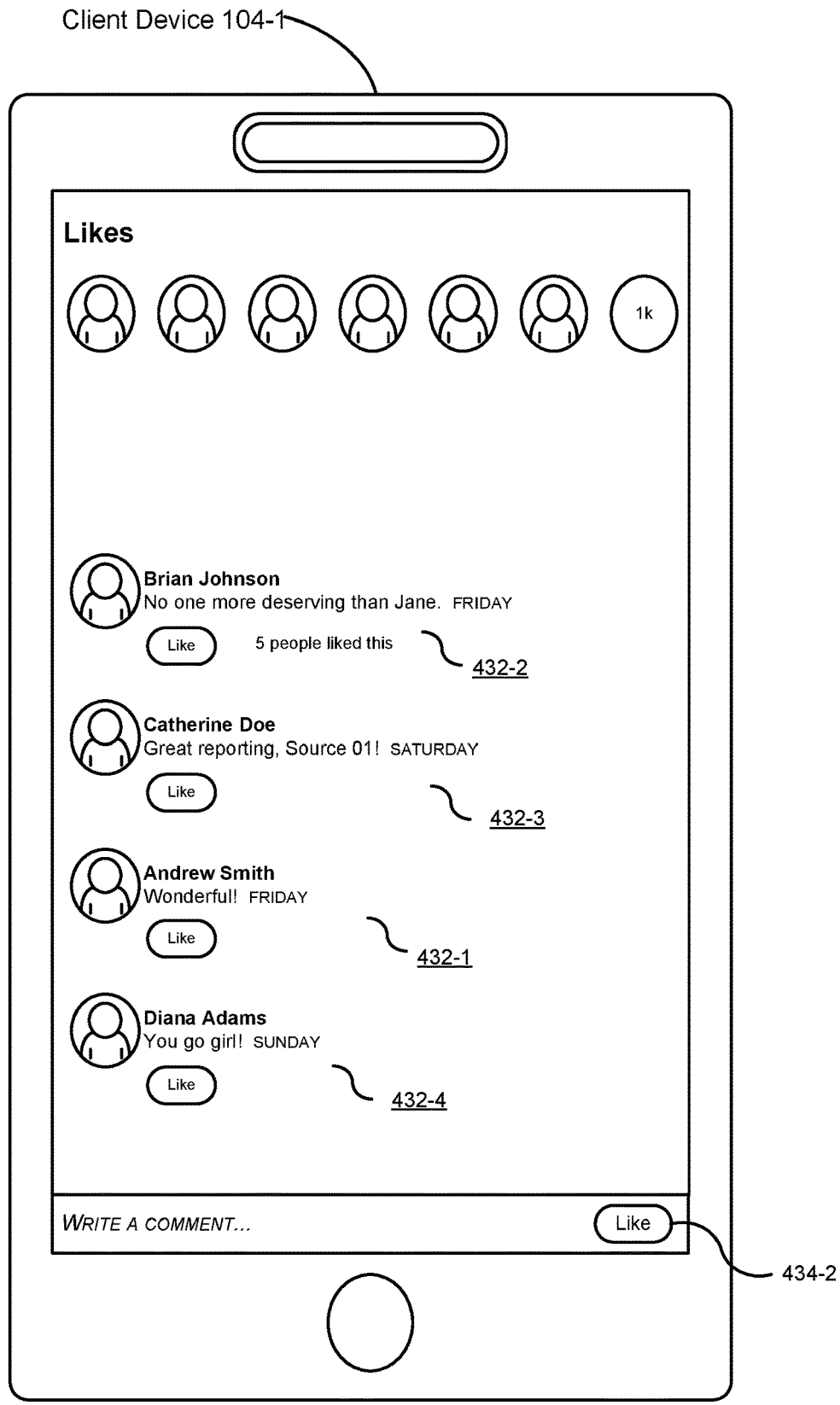

FIGS. 4A-4B illustrate exemplary GUIs on a first client device 104-1 for displaying online service comments ranked according to user feedback weight. The GUIs shown may be provided by an application for an online service (e.g., online service module 340, FIG. 3). The GUIs in these figures are used to illustrate the processes described below, including the method 500 (FIG. 5). While FIGS. 4A-4B illustrate examples of GUIs, in other embodiments, one or more GUIs display user-interface elements in arrangements distinct from the embodiments of FIGS. 4A-4B.

Figure 5A:
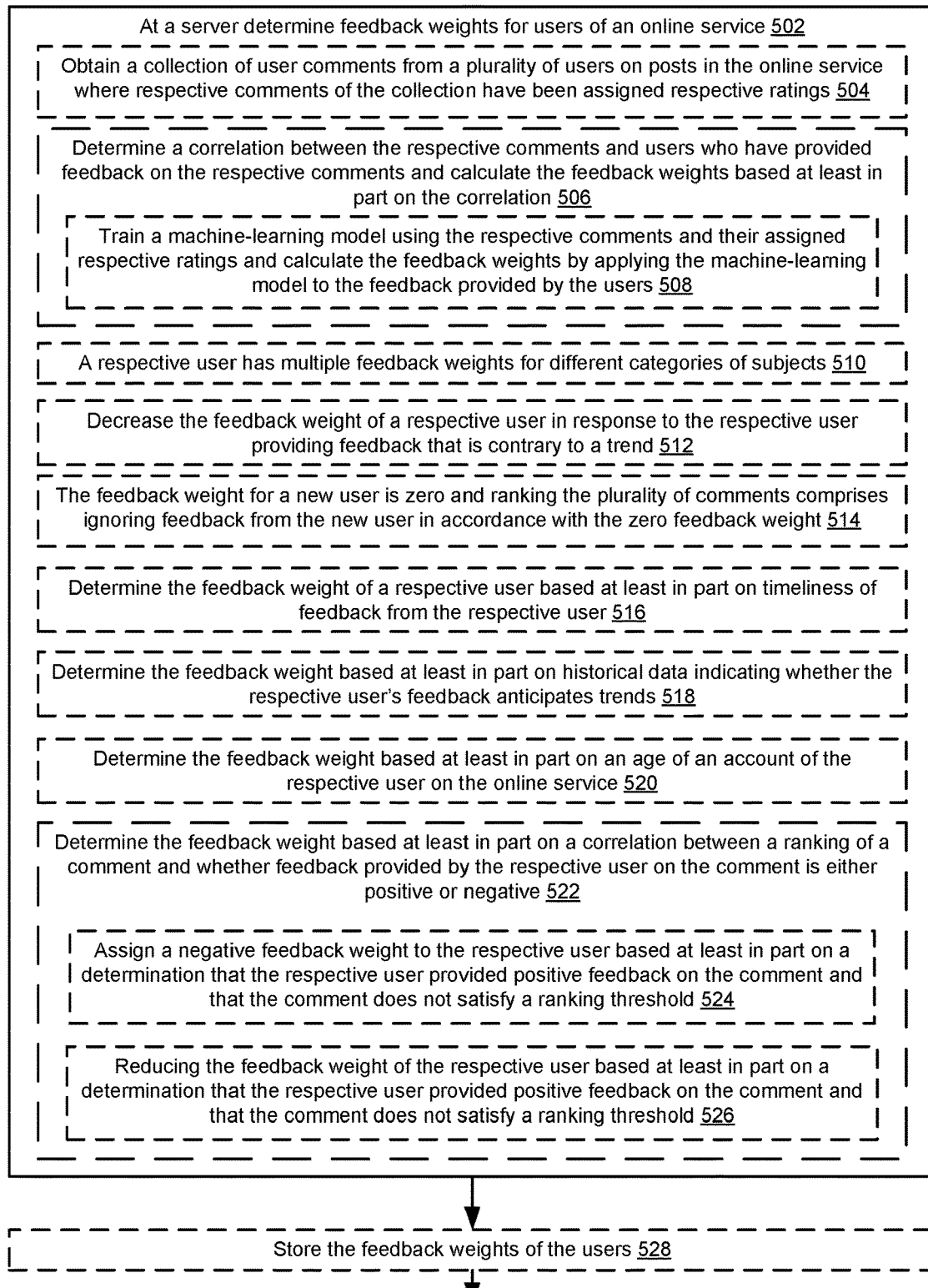
FIGS. 5A-5B illustrates a flow diagram illustrating a method of registering a contact without an account on an online service, in accordance with some embodiments.
Figure 5B:
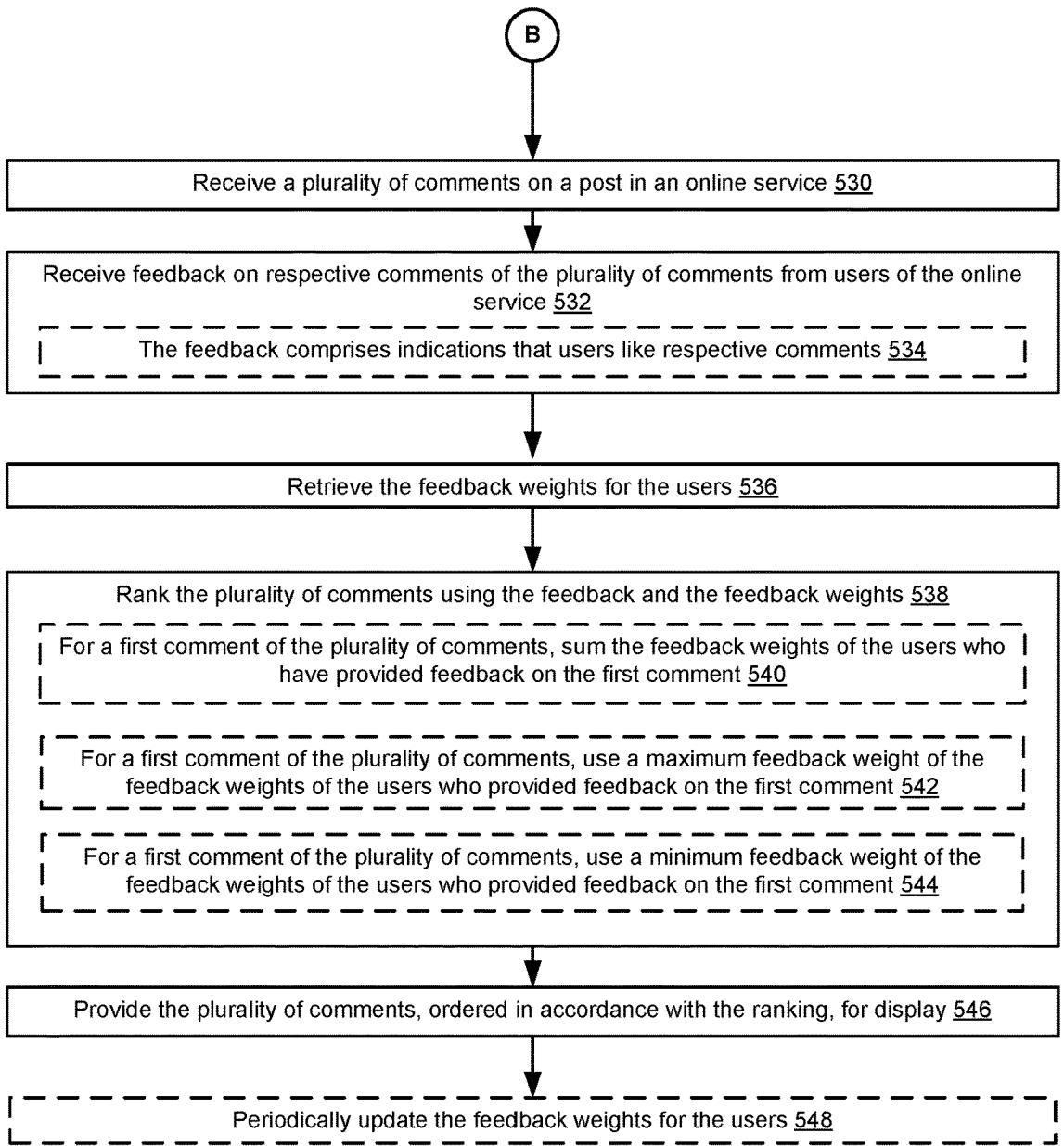

FIGS. 5A-5B are flow diagrams illustrating a method 500 of receiving, ranking, and providing comments ordered in accordance with the ranking.

The steps of the method 500 may be performed by a first client device 104-1 (FIGS. 1, 3, 4A-4B) (i.e., a first user device) and/or a server system 200 (FIG. 2) (e.g., online service server 108, FIG. 1). FIGS. 5A-5B correspond to instructions stored in computer memory (e.g., memory 306 of the client device 104, FIG. 3; memory 206 of the online service 108, FIG. 2) or another computer-readable storage medium. To assist with describing the method 500, FIG. 5 will be described with reference to the exemplary GUIs illustrated in FIGS. 4A-4B.

In some embodiments, in performing the method 500, the server 200 may determine 502 feedback weights for users of an online service. The server 200 may obtain 504 a collection of user comments from a plurality of users on posts in the online service where respective comments of the collection have been assigned respective ratings.

In some embodiments, the server 200 may determine 506 a correlation between the respective comments and users who have provided feedback on the respective comments and calculates the feedback weights based at least in part on the correlation. For example, feedback may be an indication that the user "likes" the comment or post.

In some embodiments, a machine-learning model may be trained 508 using the respective comments and their assigned respective ratings and calculate the feedback weights by applying the machine-learning model to the feedback provided by the users.

In some embodiments, a respective user may have 510 multiple feedback weights for different categories of subjects. For example, a user may have a high, positive feedback weight for a first category (e.g., sports) and a negative feedback weight for a separate category (e.g., politics).

In some embodiments, the feedback weight of a respective user may be decreased 512 in response to the respective user providing feedback that is contrary to a trend. For example, a user who provides positive feedback on a comment or a post that is trending downward (e.g., losing popularity with the users of the online service) may have a negative affected feedback weight. Similarly, a user who provides negative feedback on a comment or a post that is trending upward may have the same negative affect to its feedback weight.

In some embodiments, the feedback weight for a new user may be 514 zero and ranking the plurality of comments may comprise ignoring feedback from the new user in accordance with the zero feedback weight. For example, a new user with a new account on the online service may sustain a zero feedback weight until the user provides positive feedback on a comment and/or satisfies a predetermined threshold.

In some embodiment, the feedback weight of a respective user may be determined 516 based at least in part on the timeliness of feedback from the respective user. For example, the feedback weight may be decreased for a user who provides feedback on a post that is older than a predetermined threshold (e.g., comment was made 3 days after the post was created). Alternatively, the feedback weight may be increased for a user who provides feedback on a comment that is newer than a predetermined threshold (e.g., comment was made within 2 hours after the post was created).

In some embodiments, the feedback weight may be determined 518 based at least in part on historical data indicating whether the respective user's feedback anticipates trends. For example, a user who provides feedback on a post which garners more attention and goes "viral" (e.g., widely shared across email or social media outlets), will be determined to have a higher feedback weight compared to a user who provides feedback on a post which does not go "viral."

In some embodiments, the feedback weight may be determined 520 based at least in part on an age of an account of the respective user on the online service. For example a long time user who has not provided very much feedback on posts may have a higher feedback weight compared to a new user who has provided more feedback on recent posts.

In some embodiments, determine 522 the feedback weight based at least in part on a correlation between a ranking of a comment and whether feedback provided by the respective user on the comment is either positive or negative. For example a user may provide positive feedback on a comment that is determined to be a negative comment, and the user's feedback weight may be adjusted according to the user's feedback.

In some embodiments, a negative feedback weight may be assigned 524 to a user based at least in part on a determination that the user provided positive feedback on the comment and that the comment does not satisfy a ranking threshold. For example, if a user provides positive feedback on a post that is determined to require a negative feedback, the user may be assigned a negative feedback weight.

In some embodiments, the feedback weight of the respective user may be reduced 526 based at least in part on a determination that the respective user provided positive feedback on the comment and that the comment does not satisfy a ranking threshold. For example, if a user provides positive feedback on a post that is predetermined to require a negative feedback, the user's feedback weight may be reduced.

In some embodiments, the server system 200 may store 528 the feedback weights of the users.

In some embodiments, the server system 200 may receive 530 (FIG. 5B) a plurality of comments on a post in an online service.

In some embodiments, the server system 200 may receive 532 feedback on respective comments of the plurality of comments from users of the online service. In some embodiments, the feedback may comprise 534 indications that users like respective comments.

In some embodiments, the feedback weights for the users may be retrieved 536.

In some embodiments, the plurality of comments may be ranked 538 using feedback and the feedback weights. For example, in FIG. 4A, at the client device 104-1, comments on a post are shown. The post is not shown for simplicity and ease of understanding. The client device 104-1 shows comments from Andrew Smith 432-1, Brian Johnson 432-2, Catherine Doe 432-3, and Diana Adams 432-4 that have been received. The comments are initially ordered according to a predetermined method (e.g., sequentially by the time posted). The comments may then be ordered in accordance with the ranking of the comment, where the ranking of the comment is determined at least in part by the user's feedback weight. In this situation, Brian Johnson 432-2 has the highest feedback weight and accordingly, his comment is ranked highest. Catherine Doe 432-3 has the second highest feedback weight and her comment is ranked the second highest. Andrew Smith 432-1 is a new user and does not have a feedback weight. Additionally, Diana Adams 432-4 has a negative feedback weight and her comment is displayed last.

In some embodiments, for a first comment of the plurality of comments, the feedback weights of the users who have provided feedback on the first comment may be summed 540. In some embodiments, for a first comment of the plurality of comments, a maximum feedback weight of the feedback weights of the users who provided feedback on the first comment may be used 432. In some embodiments, a minimum feedback weight of the feedback weights of the users who provided feedback on the first comment may be used 544.

In some embodiments, the plurality of comments, ordered in accordance with the ranking, for display, may be provided 546. For example, in FIG. 4B, the comments (432-1, 432-2, 432-3, 432-4) received on the post are ordered in accordance with the ranking.

In some embodiments, the feedback weights for the users may be periodically 548 updated. For example, feedback weights for the users may be updated at a predetermined interval (e.g., hourly, daily). Alternatively or in addition, feedback weights for the users are updated according to the frequency in which the user provides feedback.

While the method 500 includes a number of operations that appear to occur in a specific order, the method 500 may include more or fewer operations. For example, steps 504, 506, 508, and 510 may be omitted, as may steps 512 and on. Some operations can be executed serially or in parallel, an order of two or more operations may be changed, and/or two or more operations may be combined into a single operation. The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a server system having one or more processors and memory storing one or more programs configured for execution by the one or more processors:
receiving a plurality of comments about a post on an online service;
receiving feedback, provided by users of the online service, regarding respective comments of the plurality of comments;
retrieving a respective user weight for each user that provided feedback;
for each of the plurality of comments, computing a respective aggregated score of the user weights for users that provided feedback for the respective comment;
ranking the plurality of comments based on the respective aggregated score for each comment; and
providing the plurality of comments, ordered in accordance with the ranking, for display.

2. The method of claim 1, wherein ranking the plurality of comments comprises:
for a first comment of the plurality of comments, summing the user weights of the users who have provided feedback on the first comment.

3. The method of claim 1, further comprising, at the server system:
determining the user weights for the users; and
storing the user weights.

4. The method of claim 3, wherein determining the user weights comprises:
obtaining a collection of user comments from a plurality of users on posts in the online service, wherein respective user comments of the collection have been assigned respective ratings;
determining a correlation between the respective user comments and users who have provided feedback on the respective user comments; and
calculating the user weights based at least in part on the correlation.

5. The method of claim 4, wherein:
determining the correlation between the respective user comments and users comprises training a machine-learning model using the respective user comments and their assigned respective ratings; and
calculating the user weights comprises applying the machine-learning model to the feedback provided by the users.

6. The method of claim 1, wherein the feedback comprises indications that users like respective user comments.

7. The method of claim 1, wherein ranking the plurality of comments comprises:
for a first comment of the plurality of comments, using a maximum user weight of the user weights of the users who provided feedback on the first comment.

8. The method of claim 1, wherein ranking the plurality of comments comprises:
for a first comment of the plurality of comments, using a minimum user weight of the user weights of the users who provided feedback on the first comment.

9. The method of claim 1, wherein a respective user has multiple user weights for different categories of subjects.

10. The method of claim 1, further comprising, at the server system, periodically updating the user weights for the users.

11. The method of claim 1, further comprising, at the server system, decreasing the user weight of a respective user in response to the respective user providing feedback that is contrary to a trend.

12. The method of claim 1, wherein:
the user weight of a new user is zero; and
ranking the plurality of comments comprises ignoring feedback from the new user, in accordance with the zero feedback weight.

13. The method of claim 1, further comprising, at the server system, determining the user weight of a respective user based at least in part on timeliness of feedback from the respective user.

14. The method of claim 1, further comprising, at the server system, determining the user weight of a respective user based at least in part on historical data indicating whether the respective user's feedback anticipates trends.

15. The method of claim 1, further comprising, at the server system, determining the user weight of a respective user based at least in part on an age of an account of the respective user on the online service.

16. The method of claim 1, further comprising, at the server system, determining the user weight of a respective user based at least in part on a correlation between a ranking of a comment and whether feedback provided by the respective user on the comment is positive or negative.

17. The method of claim 16, wherein determining the user weight of the respective user comprises assigning a negative user weight to the respective user based at least in part on a determination that the respective user provided positive feedback on the comment and that the comment does not satisfy a ranking threshold.

18. The method of claim 16, wherein determining the user weight of the respective user comprises reducing the user weight of the respective user based at least in part on a determination that the respective user provided positive feedback on the comment and that the comment does not satisfy a ranking threshold.

19. A server system, comprising:
one or more processors; and
memory storing one or more programs configured for execution by the one or more processors, the one or more programs including instructions for:
receiving a plurality of comments on a post in an online service;
receiving feedback, provided by users of the online service, regarding respective comments of the plurality of comments;
retrieving a respective user weight for each user that provided feedback;
for each of the plurality of comments, computing a respective aggregated score of the user weights for users that provided feedback for the respective comment;
ranking the plurality of comments based on the respective aggregated score for each comment; and
displaying the plurality of comments in accordance with the ranking.

20. A non-transitory computer-readable storage medium storing one or more programs configured for execution by one or more processors, the one or more programs including instructions for:
receiving a plurality of comments on a post in an online service;
receiving feedback, provided by users of the online service, regarding respective comments of the plurality of comments;
retrieving a respective user weight for each user that provided feedback;
for each of the plurality of comments, computing a respective aggregated score of the user weights for users that provided feedback for the respective comment;
ranking the plurality of comments based on the respective aggregated score for each comment; and
displaying the plurality of comments in accordance with the ranking.

* * * * *